(12) United States Patent
Bock

(10) Patent No.: US 12,484,573 B1
(45) Date of Patent: Dec. 2, 2025

(54) TOP-WATER LURE INSPIRED BILL FOR JERK-STRING ANIMATION OF A FLOATING WATERFOWL DECOY, AND JERK-STRING POLE

(71) Applicant: Kirk Bock, Benton, AR (US)

(72) Inventor: Kirk Bock, Benton, AR (US)

(73) Assignee: DELTA D & B INNOVATIONS, INC., Branson, MO (US)

( * ) Notice: Subject to any disclaimer, the term of this patent is extended or adjusted under 35 U.S.C. 154(b) by 0 days.

(21) Appl. No.: 18/917,334

(22) Filed: Oct. 16, 2024

Related U.S. Application Data

(60) Provisional application No. 63/568,014, filed on Mar. 21, 2024, provisional application No. 63/590,491, filed on Oct. 16, 2023.

(51) Int. Cl.
  *A01M 31/06* (2006.01)
(52) U.S. Cl.
  CPC .................................. *A01M 31/06* (2013.01)
(58) Field of Classification Search
  CPC ...................................................... A01M 31/06
  See application file for complete search history.

(56) References Cited

U.S. PATENT DOCUMENTS

| | | | | |
|---|---|---|---|---|
| 1,666,896 A | * | 4/1928 | Habenicht | B60T 17/046 248/300 |
| 2,437,604 A | * | 3/1948 | Hufford | A01M 31/06 D22/125 |
| 2,525,120 A | * | 10/1950 | Ernst | A01M 31/06 43/3 |
| 2,753,054 A | * | 7/1956 | Becher | A47G 29/08 248/108 |
| 3,021,635 A | * | 2/1962 | Robert | A01M 31/06 43/3 |
| 3,733,733 A | | 5/1973 | Ruter | A01M 31/06 |
| 3,896,578 A | * | 7/1975 | Franceschini | A01M 31/06 43/3 |
| 5,172,507 A | | 12/1992 | Franceschini | A01M 31/06 |
| 5,207,757 A | * | 5/1993 | Franceschini | A01M 31/06 43/3 |
| 5,566,491 A | | 10/1996 | Phillips | A01M 31/06 |
| 5,832,650 A | | 11/1998 | Franceschini | A01M 31/06 |
| 5,899,014 A | | 5/1999 | Bornhoft et al. | A01M 31/06 |
| 6,543,176 B1 | | 4/2003 | McGhghy | A01M 31/06 |
| 7,082,710 B1 | * | 8/2006 | Jorgenson | A01M 31/06 43/2 |

(Continued)

*Primary Examiner* — Monica L Perry
*Assistant Examiner* — Brittany A Lowery
(74) *Attorney, Agent, or Firm* — Jonathan A. Bay

(57) ABSTRACT

A water-plowing front wall is mounted crosswise across the breast of a buoyant floating waterfowl decoy for improving jerk-line life-like animation of the decoy. The water-plowing front wall has a broad width about the same as or twice as great as the decoy's body-width at the waterline. The water-plowing front wall has a low elevation that, when the decoy is at rest, the low elevation is submerged below the waterline. And, the water-plowing front wall has a high elevation that, when the decoy is at rest, is about level with the waterline or the waterline is about half-way up the front wall. High front wall produces a zig-zag swimming return, while the low front wall in combination with a diving plane produces a head-bobbing diving return.

9 Claims, 20 Drawing Sheets

(56) References Cited

U.S. PATENT DOCUMENTS

| | | | | |
|---|---|---|---|---|
| 7,409,793 | B1* | 8/2008 | Schwarz | A01M 31/06 43/3 |
| 7,568,305 | B2* | 8/2009 | Fanfelle | A01M 31/06 248/908 |
| 9,924,711 | B1* | 3/2018 | Gill, II | A01M 31/06 |
| 10,321,674 | B1* | 6/2019 | Goodwin | A01M 31/06 |
| 11,589,573 | B1 | 2/2023 | Kennedy | A01M 31/06 |
| D999,875 | S* | 9/2023 | Uptegrove | D22/125 |
| 2003/0172576 | A1* | 9/2003 | Igo | A01M 31/06 43/3 |
| 2005/0268522 | A1 | 12/2005 | Foster et al. | A01M 31/06 |
| 2006/0283071 | A1* | 12/2006 | Haley | A01M 31/06 43/3 |
| 2015/0059229 | A1* | 3/2015 | Miller | A01M 31/06 43/3 |
| 2020/0323196 | A1 | 10/2020 | Clark | A01M 31/06 |
| 2022/0125039 | A1 | 4/2022 | Wood et al. | A01M 31/06 |
| 2023/0329226 | A1* | 10/2023 | Uptegrove | A01M 31/06 |

\* cited by examiner

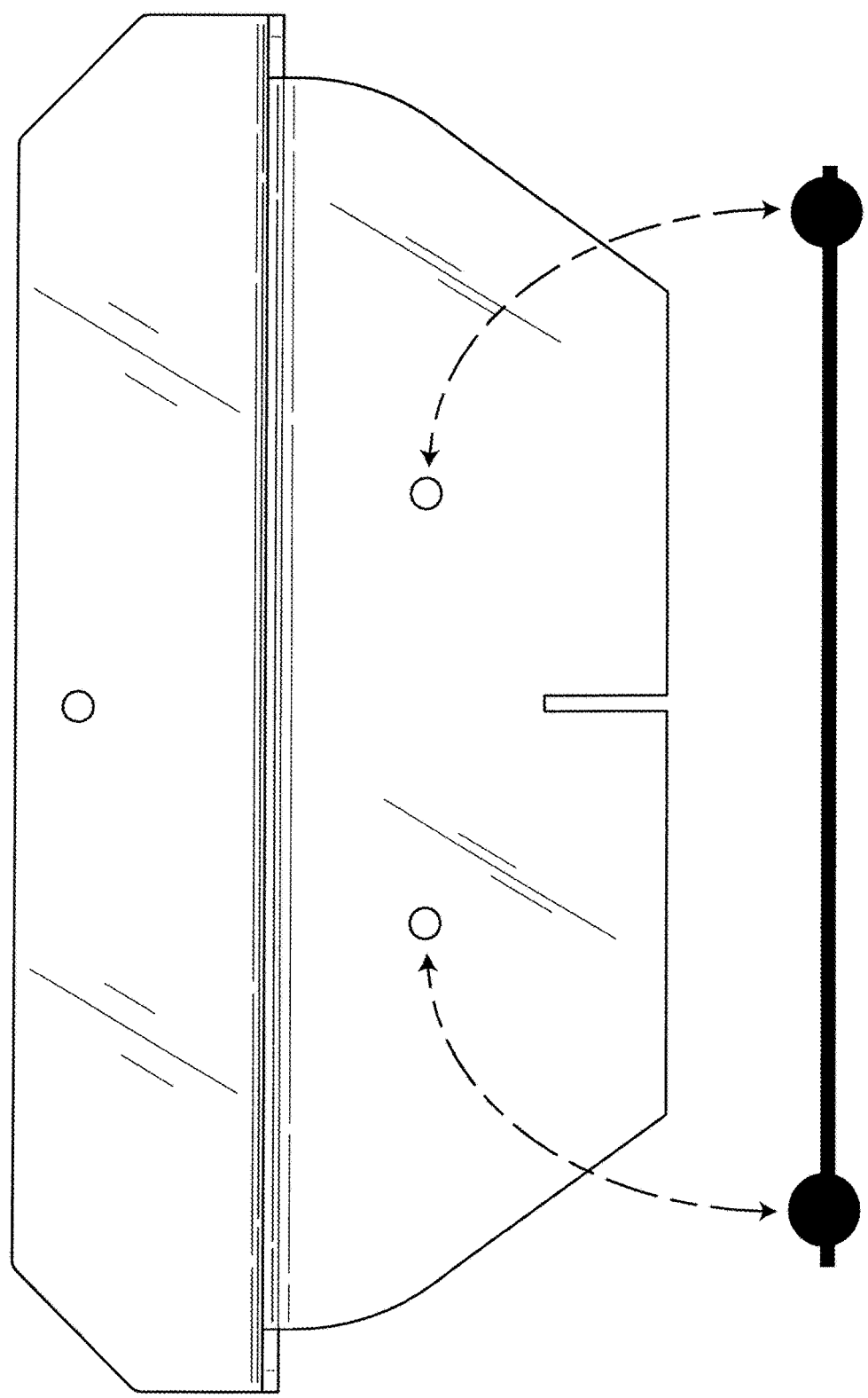

TOP-WATER LURE INSPIRED BILL FOR JERK-STRING ANIMATION OF A FLOATING WATERFOWL DECOY, AND JERK-STRING POLE

CROSS-REFERENCE TO PROVISIONAL APPLICATION(S)

This application claims the benefit of U.S. Provisional Application No. 63/590,491, filed Oct. 16, 2023 and U.S. Provisional Application No. 63/568,014 filed Mar. 21, 2024. The foregoing patent disclosure(s) is (are) incorporated herein by this reference thereto.

BACKGROUND AND SUMMARY OF THE INVENTION

The invention relates to buoyant floating waterfowl decoys and, more particularly, to a top-water (fishing) lure inspired bill for jerk-string animation of a floating waterfowl decoy, and as well as to a jerk-string pole for use therewith.

The word "bill" could have two different meanings in this use environment and at the outset the following distinctions are intended to be followed through out. Many bird identification books begin with the subject of "Bird Topography," where drawings of birds are provided with lead lines pointing to and naming all their features. Some waterfowl have, as part of their anatomy, "beaks," not too different from chicken beaks. Most others might have that part of their anatomy referred to as "bills." That usage of that for fowl anatomy is intended to be avoided throughout this description. If it is necessary to refer to that anatomy hereinbelow, a different anatomically-correct term will be applied, namely, "mandibles."

"Bill" from here on out means the swim-action imparting bills in accordance with the invention that are accessory attachments to buoyant floating waterfowl decoys.

A number of additional features and objects will be apparent in connection with the following discussion of the preferred embodiments.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 20 is a bottom plan view comparable to FIG. 14, except wherein showing a slightly altered version of the second embodiment, and further showing a bungee shock cord belt loop in accordance with the invention for tethering or strapping the animation-action imparting swim bill onto the decoy.

DETAILED DESCRIPTION OF THE PREFERRED EMBODIMENTS

Figure 14:
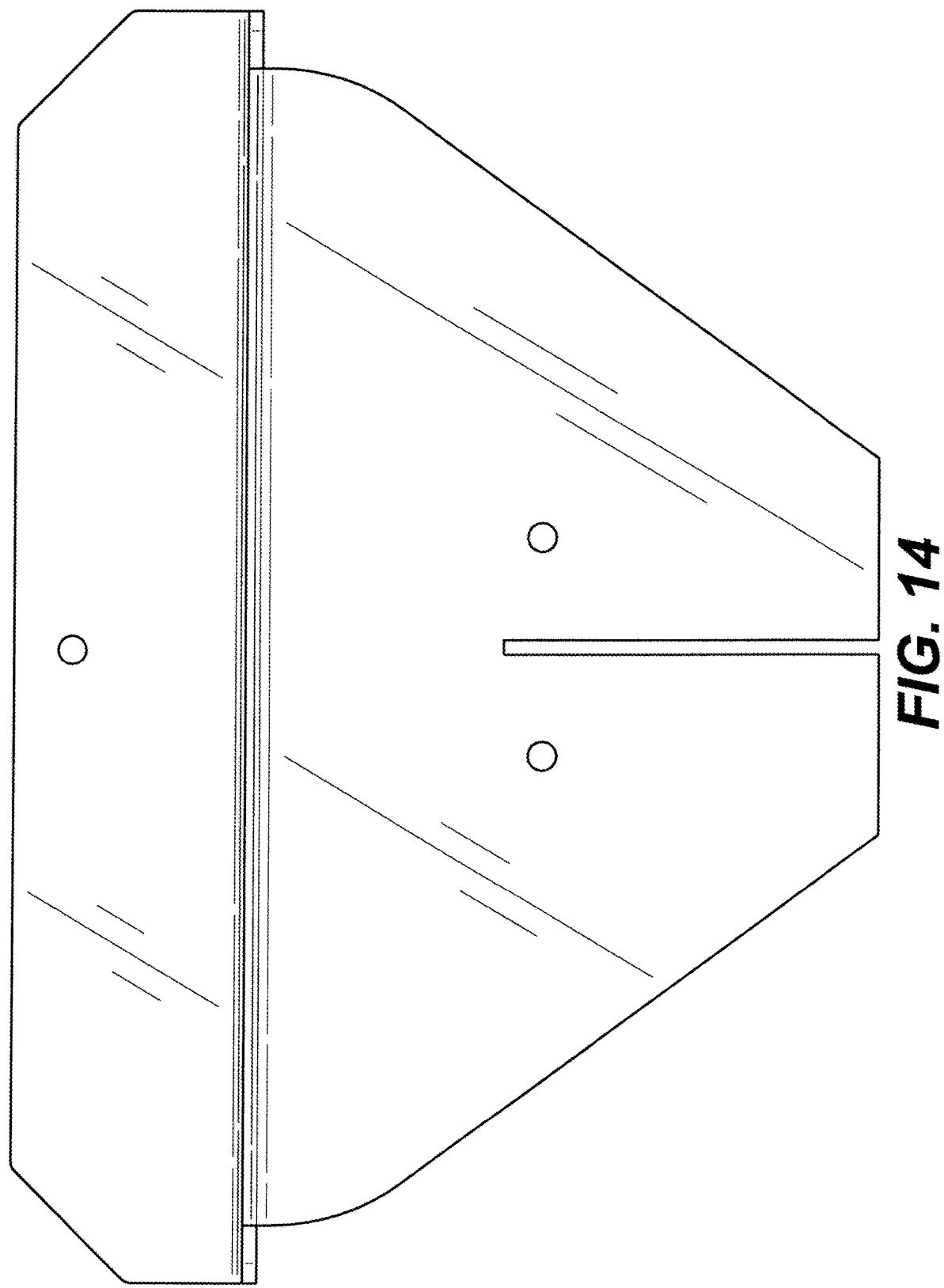
FIG. 14 is a bottom plan view thereof.
Figure 15:
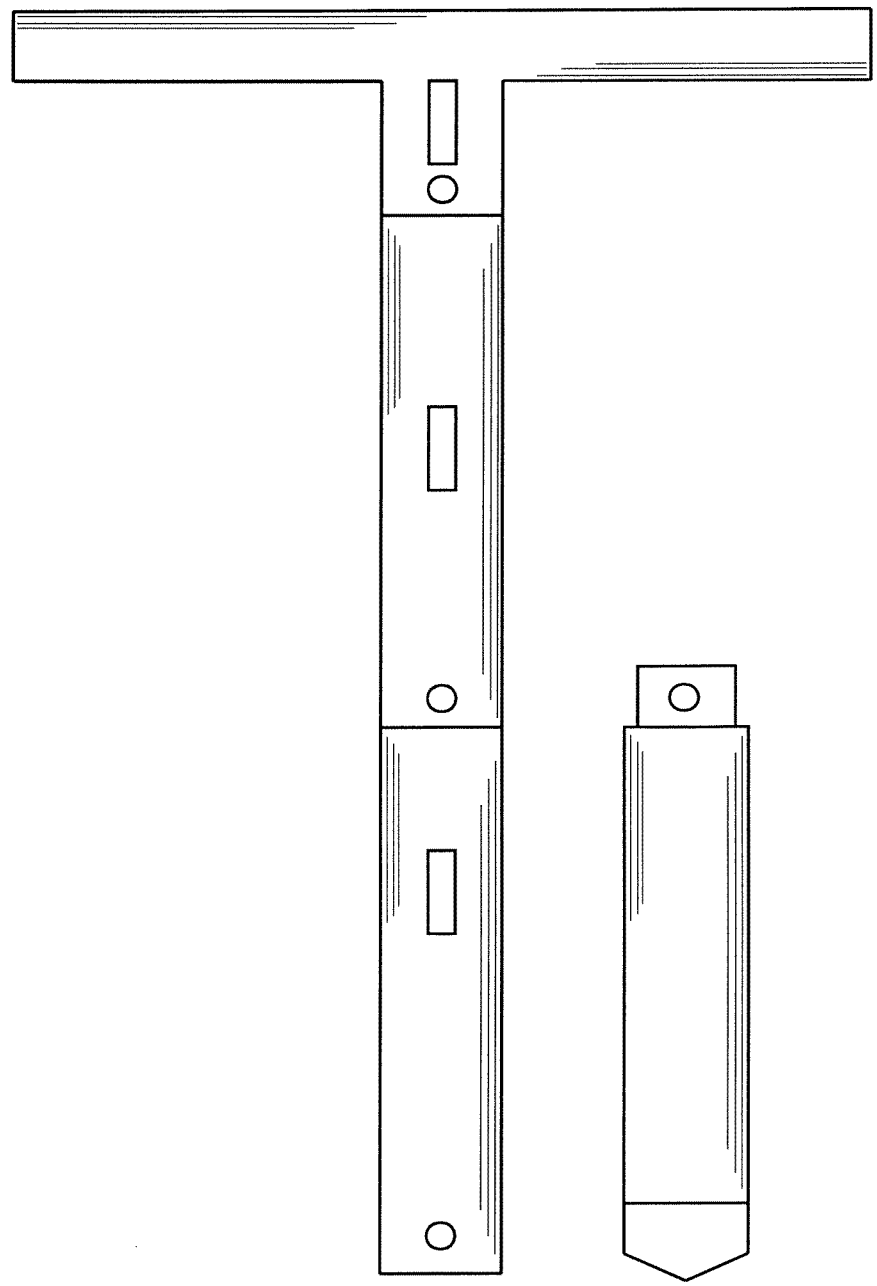
FIG. 15 is a partially-exploded front elevation view of a jerk-string pole in accordance with the invention, for combining with the various embodiments of the top-water lure inspired bill in accordance with the invention, for jerk-string animation of a floating waterfowl decoy.
Figure 16:
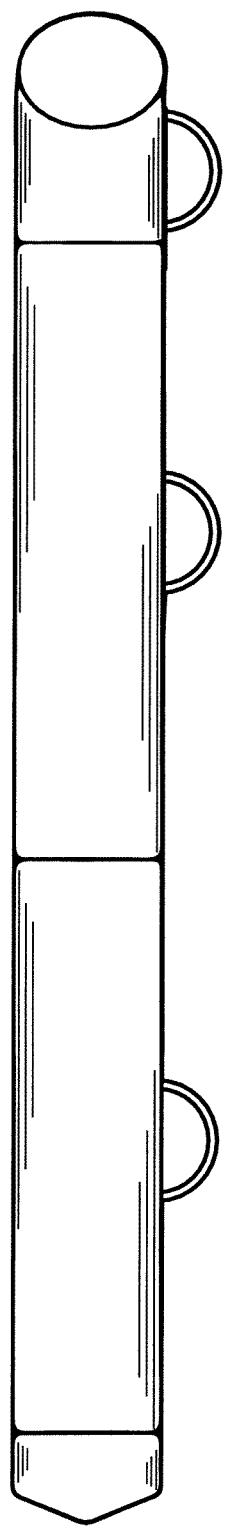
FIG. 16 is a side elevation view thereof.
Figure 17:
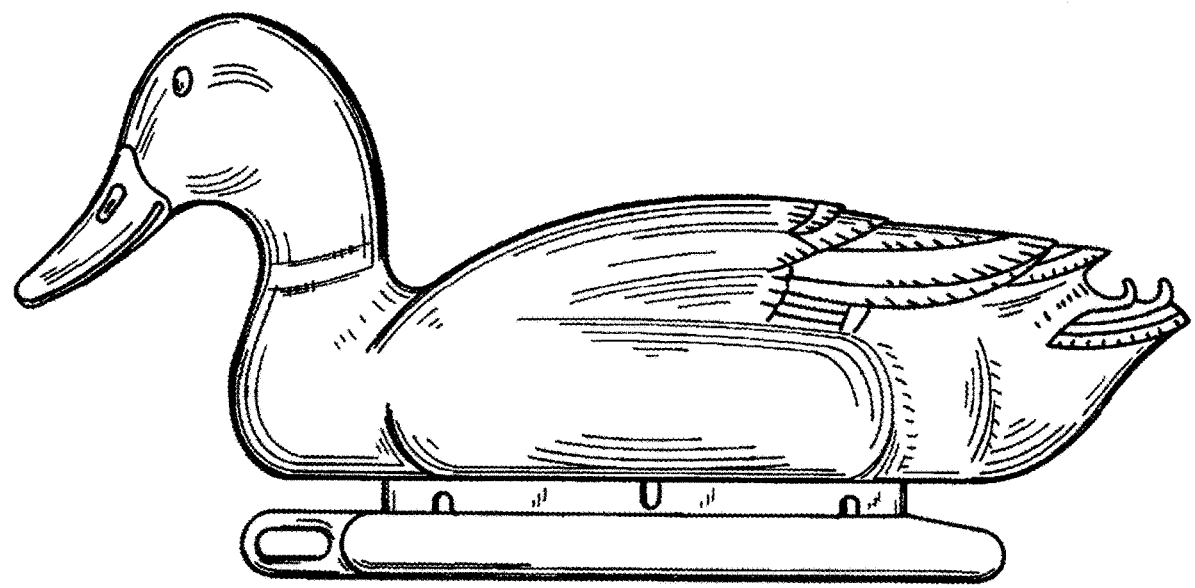
FIG. 17 is a side elevational view of a buoyant floating waterfowl decoy in accordance with the prior art, from U.S. Pat. No. 5,832,650—Franceschini, the disclosure of which is incorporated herein in full by this reference thereto.
Figure 18:
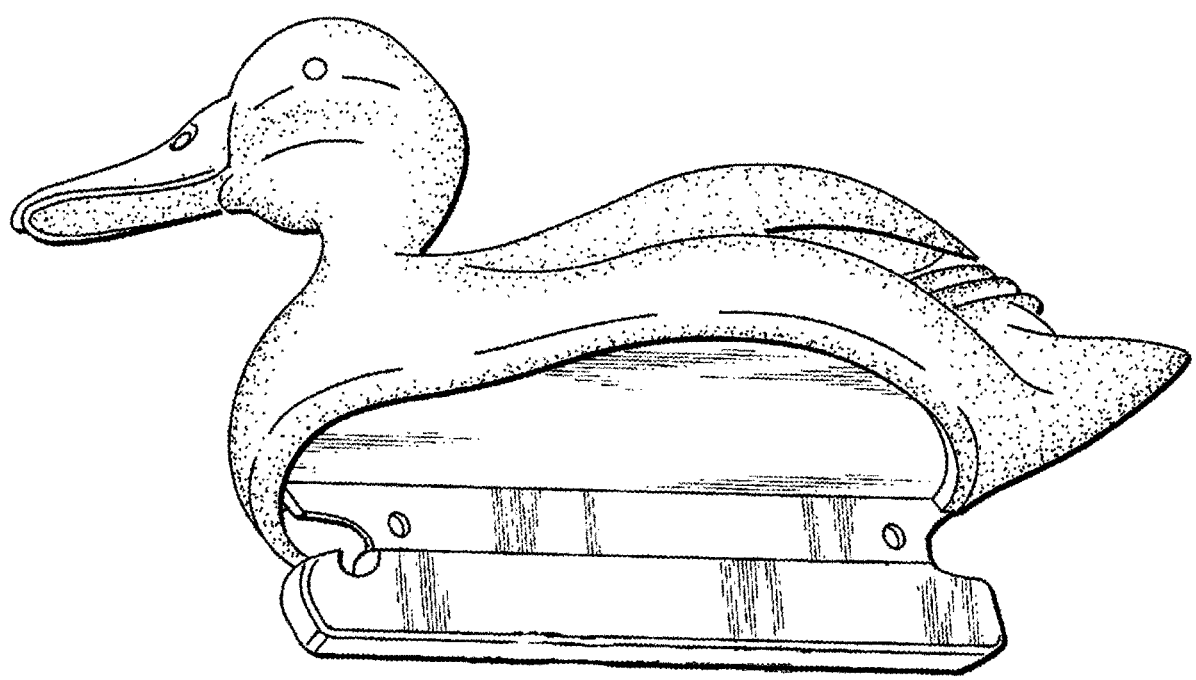
FIG. 18 is a bottom perspective view of a comparable buoyant floating waterfowl decoy in accordance with the prior art, from U.S. Pat. No. 6,543,176—McGhghy, the disclosure of which is incorporated herein in full by this reference thereto.
Figure 19:
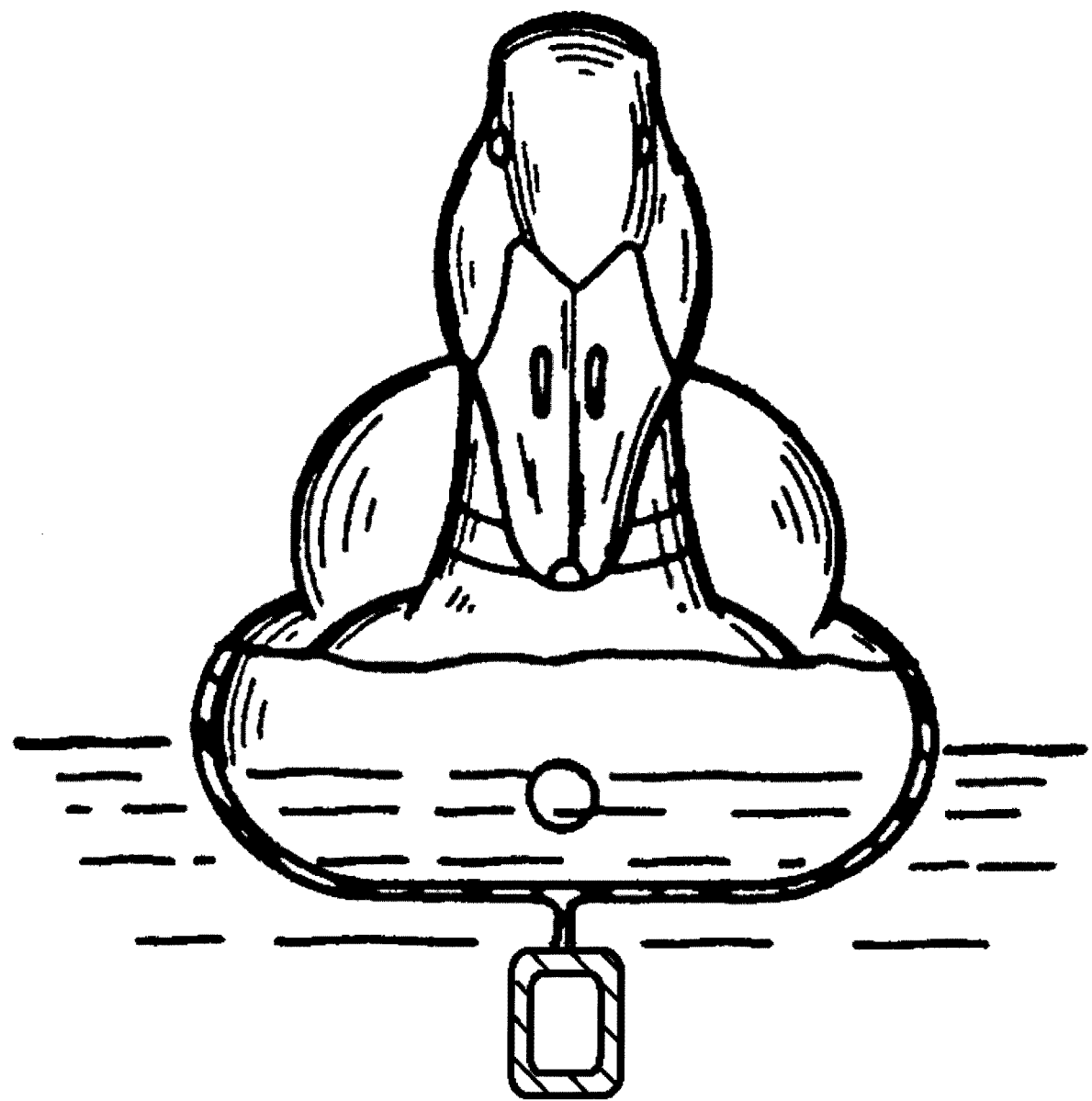
FIG. 19 is a front elevational view, partly in section, of another comparable buoyant floating waterfowl decoy in accordance with the prior art, from U.S. Pat. No. 5,172,507—Franceschini, the disclosure of which is incorporated herein in full by this reference thereto.

FIGS. 15 and 16 show a jerk-string pole in accordance with the invention, for combining with the various embodiments of the top-water lure inspired bill in accordance with the invention (see FIGS. 1-7 and 8-14), for jerk-string animation (see FIGS. 1 and/or 8) of a buoyant floating waterfowl decoy (eg., see FIGS. 17-19).

Figure 1:
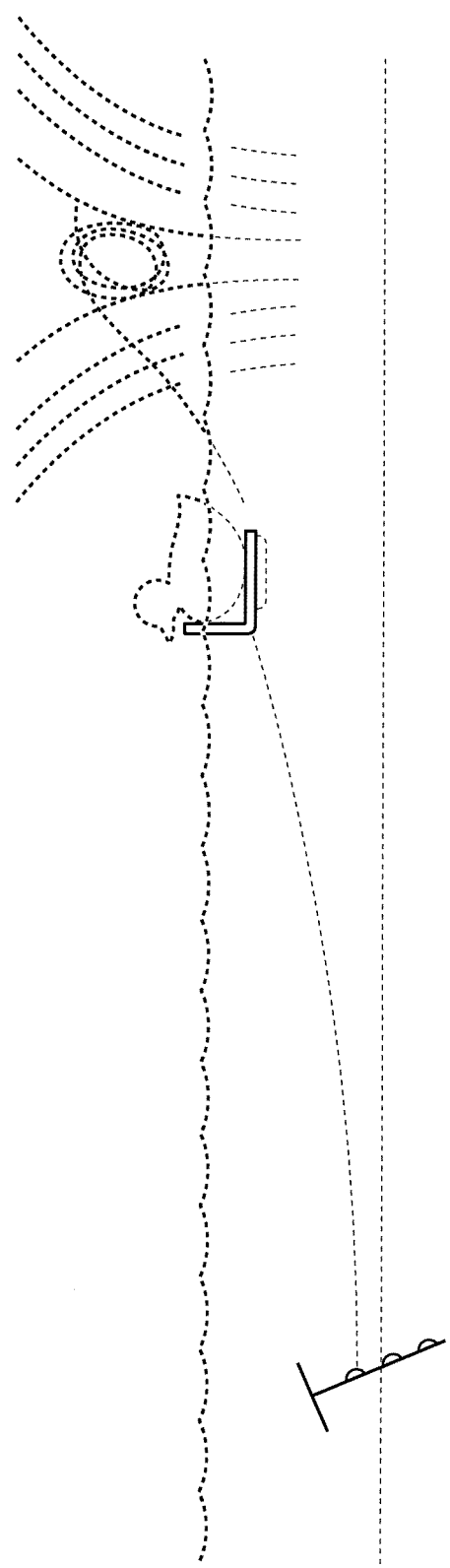
FIG. 1 is a perspective view of a first embodiment of a top-water lure inspired bill in accordance with the invention for jerk-string animation of a buoyant floating waterfowl decoy, and shown in an environment of use.
Figure 8:
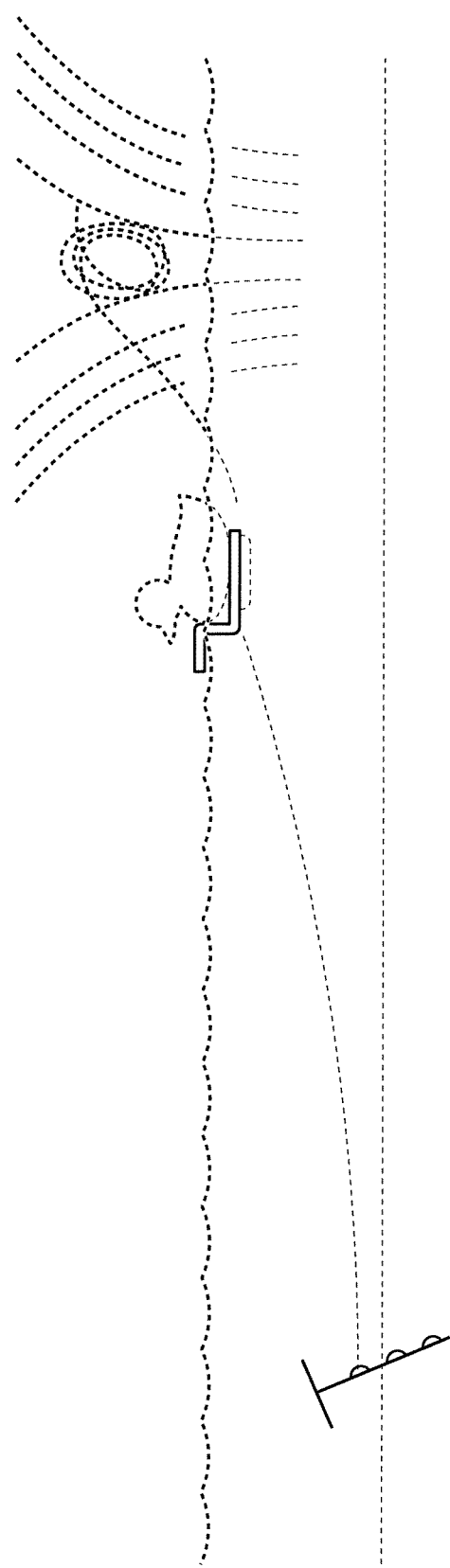
FIG. 8 is a perspective view of a second embodiment of a top-water lure inspired bill in accordance with the invention for jerk-string animation of a buoyant floating waterfowl decoy, and shown in an environment of use.

The jerk-string pole in accordance with the invention serves as an anchor (see FIGS. 1 and/or 8) in a muck (soft) bottom of a shallow aquatic environment likely to be visited by waterfowl. There is no one way to set up a decoy jerk-string animation set-up. FIGS. 1 and 8 show one non-exclusive non-limiting way.

But first, there is the subject matter of decoys in general. FIGS. 17-19 show that a decoy typically comprises a hollow hard or soft plastic construction having simulated waterfowl anatomical/physiological structure. The actual material is of no significance, and the decoy can be cast out of a castable material or monolithic carving out of wood. Regardless, the decoy typically extends from a head to a tail (or more particularly, mandibles to tail), between (relatively rearward) flanks and (relatively forward) sides of the body.

Since the decoy floats, and since resting live waterfowl typically ride high and buoyantly, at the waterline the decoy extends from breast to ventral region.

Not too far below the waterline, the decoy transitions into more utilitarian structural features like a flat belly, with an abbreviated keel extending front-to-back a little less than the whole length of the belly between front and rear terminations. The keel carries an elongated ballast pontoon (tube) that extends between front and rear ends that project forwardly and rearwardly of the front and rear terminations of the keel, respectively. Hence there are front and rear notches defined respectively by (1) the flat belly, the front termination of the keel, and the bow of the ballast pontoon; as well as (2) the flat belly again, the rear termination of the keel, and the stern of the ballast pontoon.

The ballast pontoon typically is filled/partially filled with some amount of sand (or other ballast). Both the keel and ballast pontoon are formed with several various kinds of line or cord attachment features likes eyes, holes, slits and so on.

To return to FIGS. 1 and 8, they show a blind and a jerk-string animation set-up comprising (1) a decoy, (2) a jerk-string pole anchored in the soft bottom, (3) a bungee shock cord having one end fixed to the jerk-string pole and the other end fixed to the bow of the ballast pontoon (or any front part of the decoy), and (4) a jerk string having a far end tied to the stern of the ballast pontoon (or any rear part of the decoy) and a user-graspable end probably secured in the blind by a cleat or the like, with any excess preferably tidily stowed in loose coils.

The bungee shock cord would have an original at-rest length (not shown). Preferably the bungee shock cord is highly stretchable when pulled (ie., when tensioned) and has a significant restoration property (ie., return to original at-rest length). That way, the bungee shock cord can be held stretched, in tension, for period of time. But when the tension is released, the bungee shock cord should restore itself back to its original at-rest length.

The jerk string preferably has little or no stretch. Nylon has stretch, and hence is not preferred but not excluded. On the other hand, DYNEEMA® has no stretch, so it and materials with like non-/low-stretch properties are preferred.

The jerk-string pole is preferably made out of one inch square or round metal or plastic tubing so that it can be broken down in sections. FIG. 15 shows four sections, a T-handled upper section, an indefinite number of mid-sections (two shown), and a sharp pointy-ended lower section. The sections have respective receiving and socket ends that are snap-locked together by push-button spring clips.

Although a multi-section tubular shaft is preferred, the shaft can alternatively be a monolithic piece of angle bar, or round rod and so on. The shaft has a set of metal loops (or eyes, three shown), onto which a user can clip carabineers.

In use, the user just takes the jerk-string pole by the T-handle and drives it into the soft (presumably mud or sand) bottom. The user just drives the tip of the T-handled pole into the bottom down with about a forty-five degree (45°) angle between the shaft and water surface. The user drives the T-handled pole down until the desired hookup-eye reaches the desired depth, usually surface level or a little bit sub-surface. Then the user hooks the jerk-pole-end of the bungee shock cord by the carabineer (eg., or by any knot or loop or other clip) on the selected hook-up eye.

The bungee shock cord extends between one end secured to a carabineer that is releasably clipped onto the selected hook-up eye T-handled pole, and, an opposite end secured to some portion of the decoy, preferably a forward portion of the keel or ballast pontoon (by perhaps another intermediary carabineer or clip or hook).

Again, FIGS. 1 and 8 show a non-limiting example of a decoy jerk-string animation set-up in a waterfowl-hunting marsh environment. FIGS. 1 and 8 show a duck blind in shallow water, a spaced away anchor (eg., T-handled jerk-string pole), a stretched bungee shock core tied between the anchor and decoy, the decoy, a swim-action imparting bill (ie., decoy-accessory in accordance with the invention), and a rear jerk string (tow-back line) to tension the bungee shock and then hold the decoy still or release the tension and allow the bungee shock cord to drag the decoy back to the anchor by means of the restoration property of the stretched bungee shock cord. The jerk string would probably be secured in the blind by a cleat or the like, with excess or loose coils of the jerk string ready to be let loose and let the stretched bungee shock cord drag the decoy forward to/towards the anchor. The swim-action imparting bill imparts a life-like swimming action during this time.

In the angling world, there are a wide variety of top water fishing lures. Some like the HULA POPPER® retrieve in an alternating series of (1) partially-diving forward-lunging pops, with (2) restoring re-floating pauses. Others like the JITTERBUG® retrieve such that the incoming action is yawing side-to-side: partly left, partly right, all the way in.

In the FIGS. 1 and 8 decoy jerk-string animation set-up, the first embodiment of a top-water lure inspired bill in accordance with the invention retrieves back in the manner reminiscent of a HULA POPPER®. In contrast, the first embodiment of a top-water lure inspired bill in accordance with the invention retrieves back in the manner reminiscent of a JITTERBUG®. Other observers might not see it that way and so the foregoing is a non-limiting example of observation from a particular observer's bias.

But in fundamentals, the FIGS. 1 and 8 decoy jerk-string animation set-up is intended to give the decoys a non-static animation. A hunter tows the decoy back to the blind by the jerk string, and holds the decoy there (eg., tying it off by a cleat or the like), with the bungee shock cord stretched in tension. When waterfowl game birds fly over, the hunter releases the decoy, and the bungee cord "swims" the decoy away from the blind and towards the anchor with life-like animation.

Again, it was mentioned above that there is no one way to set up a decoy jerk-string animation set-up. Another non-limiting and non-exclusive way is to make the bungee shock cord very short. That is, this is where the decoy jerk-string animation set-up comprises the following. The length of distance between the selected hook-up eye of the T-handled jerk-string pole and decoy is short such that there is no slack in the bungee shock cord. One increment of elongation will result in tensioning the bungee shock cord. And here, the contribution of the jerk string shows itself. A user jerking and jerking on the jerk string will cause the decoy to lurch tension-wise, and then after tension release lurch back toward bungee shock cord restoration-anchor: back and forth. The decoy does not move very far from radius about the anchor. This is purported to be simulative of feeding activity.

And there is no limit how many different way of decoy jerk-string animation set-ups can be implemented on the waterfowl hunting marsh. They can be combined, and deployed at different times in different fashions. One decoy can be animated like feeding (that is, in a small radius about the anchor). Another decoy can be animated like swimming twenty feet or so away (6 m) to join the feeding. Both the bungee shock cords of both decoys can be anchored to a common anchor (eg., T-handled jerk-string pole). The difference is the length of the respective bungee shock cords, namely, one being short and the other being long. The respective jerk strings can be of indefinite long lengths. The excess lengths of the jerk strings can be coiled or let lay in loose piles but the active lengths extending out between the blind and the respective decoys might be secured to respectively different cleats in the blind.

FIGS. 2-7 show a first embodiment of a bill, or 'animation enhancer' in accordance with the invention. The bill preferably is constructed of transparent sheet material, including without limitation PLEXIGLAS®. The bill has a front generally vertical wall that is between ten to twelve inches (twenty-five to thirty cm) wide and two to four inches (five to ten cm) high. The bill has a mounting fixture arrangement that positions the front wall essentially laterally crosswise in front of the breast of the decoy. The front wall preferably abuts the breast of the decoy and is disposed underneath the mandibles.

The mounting fixture arrangement comprises a horizontal panel. The front wall and horizontal mounting panel are monolithic piece of transparent plastic material (eg., PLEXIGLAS® being a non-limiting example) bent into an "L" shape. The mounting panel has a streamlined truncated triangular outline. The truncated triangular outline begins at a forward fold-line with the bottom of the front wall. The forward fold-line is about same width as the front wall, any minimal chamfers aside. The truncated triangular outline extends rearward from there tapering on both sides at about a thirty-five degree angle to a truncated rear edge. The length between the forward fold line and the rear edge might be anywhere between three inches to six inches. The width of the rear edge might be correspondingly the six inches to three inches wide.

The bill is symmetric about an axial vertical plane of symmetry. The mounting panel is formed with a closed-ended slot that has an open end in the rear edge, and extends forwardly to a forward closed end. The bill and decoy are joined together by sliding the keel of the decoy into this slot. Preferably the distance between the closed end of the slot and the plane of the front wall is chosen with some care. That way, when the keel of the decoy is slid into the closed-ended slot and the front termination of the keel runs against and is stopped by the closed end of the closed-ended slot, then that defines the position of the front wall relative the breast of the duck. Preferably, the location of the closed end of the closed-ended slot relative the distance to the front wall is chosen so that not only (1) the keel and closed end of the closed ended slot are in abutment, but so are (2) the decoy breast and rear surface of the front wall.

Thus when joining the mounting panel and decoy, the mounting panel is slid along the keel and glides in the vertical gap between the flat belly of the decoy and the ballast pontoon. When the mounting panel comes to rest (either, one, the keel and closed end of the closed ended slot are in abutment, and/or also, two, the decoy breast and rear surface of the front wall are in abutment), the animation-action imparting bill is fairly locked in place. There is little freedom of relative displacement between the bill and decoy, except, and this is an important exception, being slid apart with the bill be slid forward (or decoy rearward).

Figure 2:
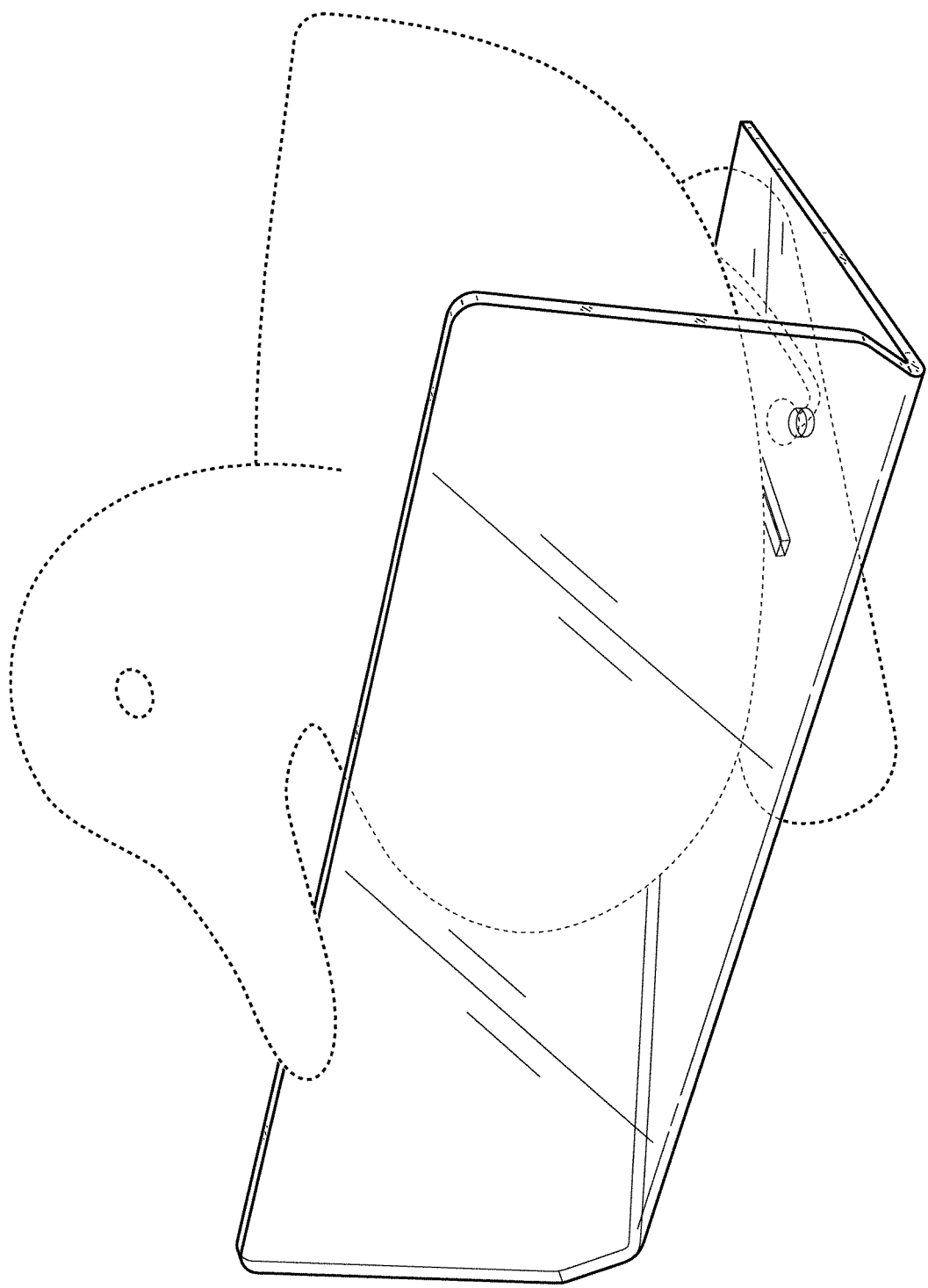
FIG. 2 is an enlarged-scale perspective view thereof, except with the aquatic environmental subject matter removed from view.
Figure 3:
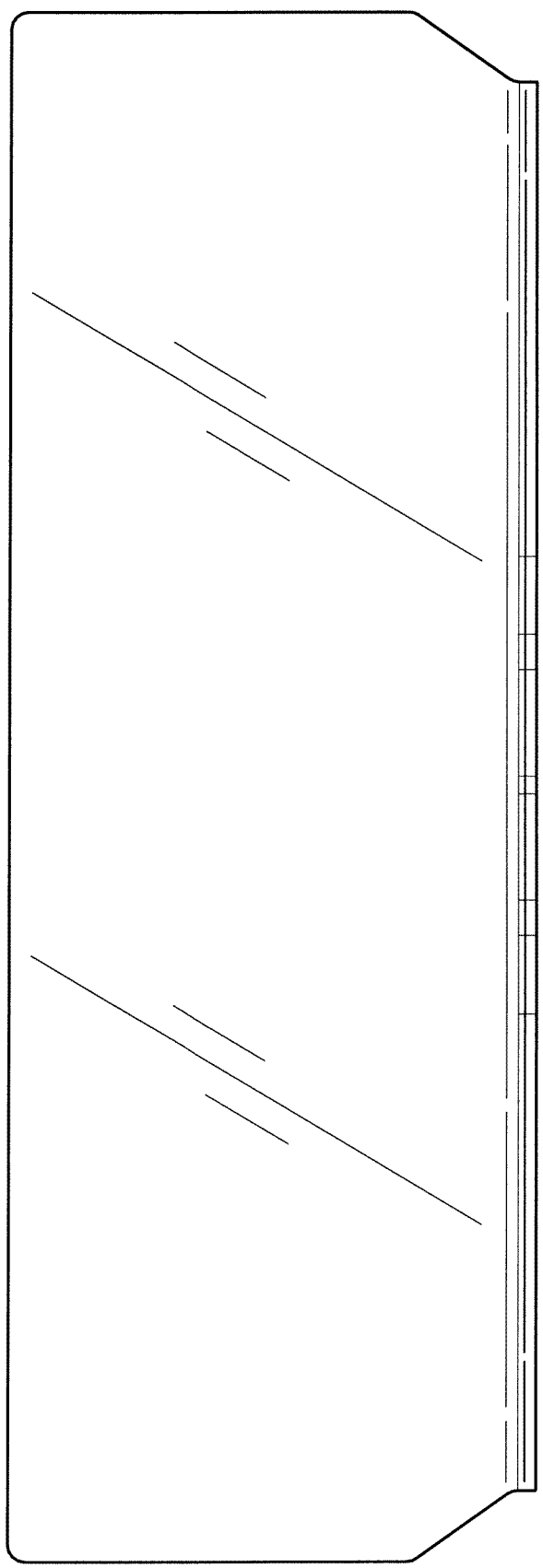
FIG. 3 is an enlarged-scale front elevational view thereof, with all environmental subject matter removed from view.
Figure 4:
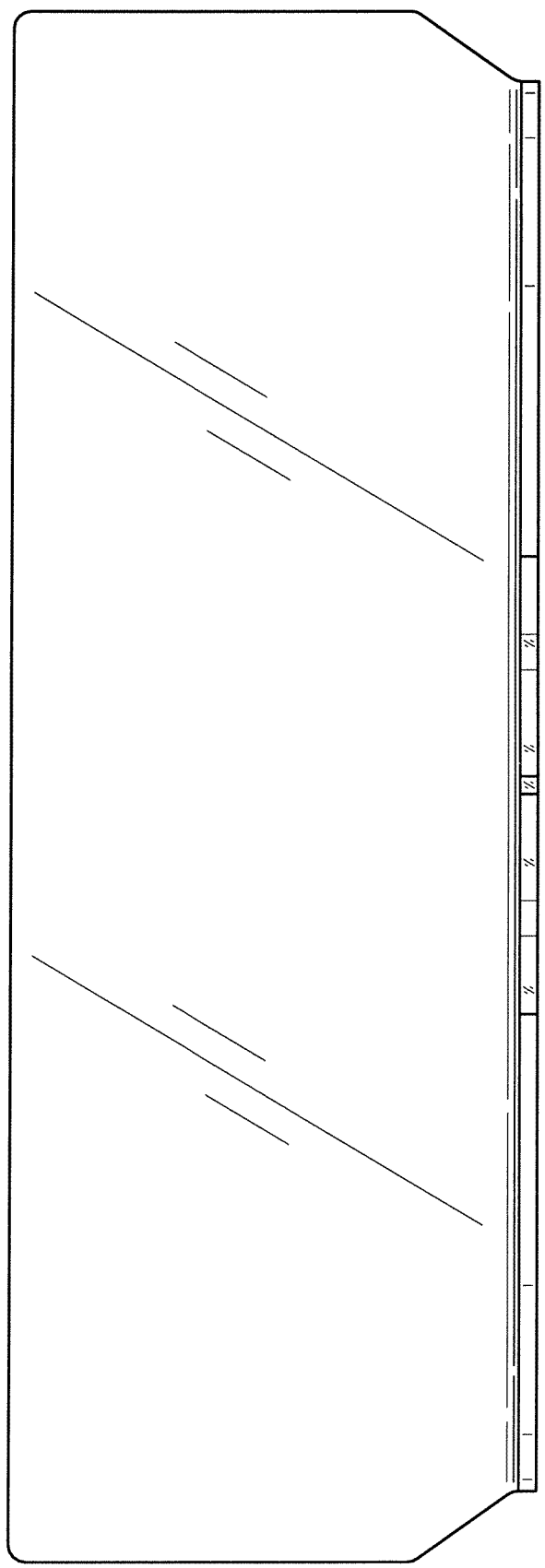
FIG. 4 is a rear elevational view thereof.
Figure 5:
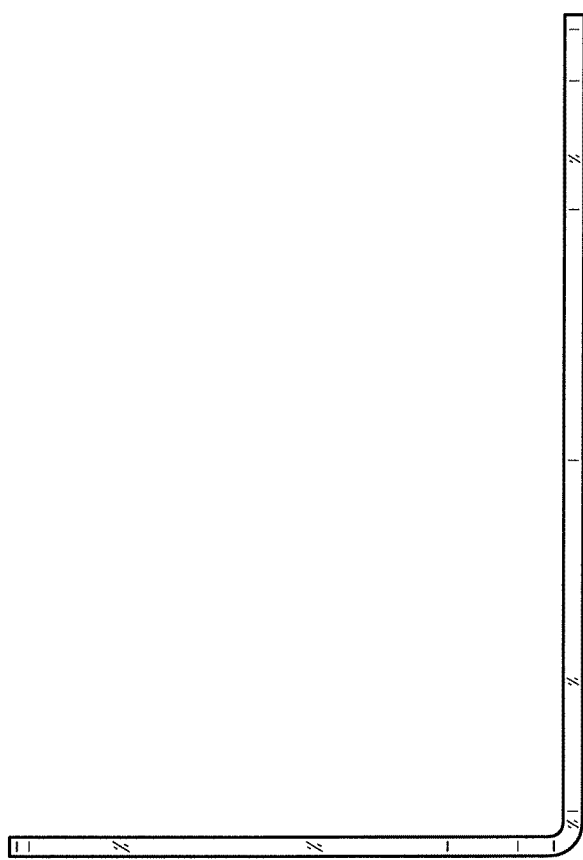
FIG. 5 is a left side elevational view thereof, the right side being a mirror opposite.
Figure 6:
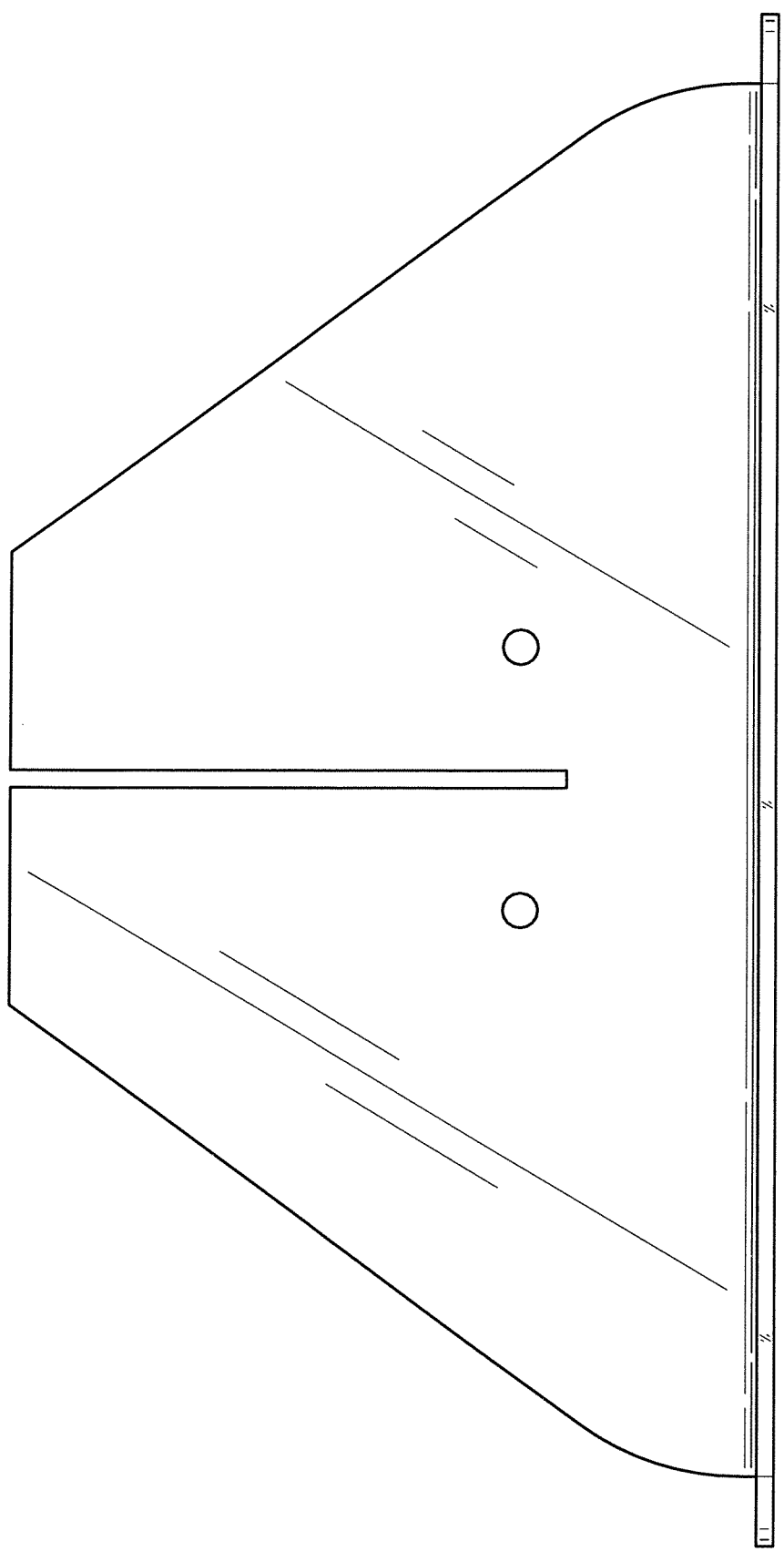
FIG. 6 is a top plan view thereof.
Figure 7:
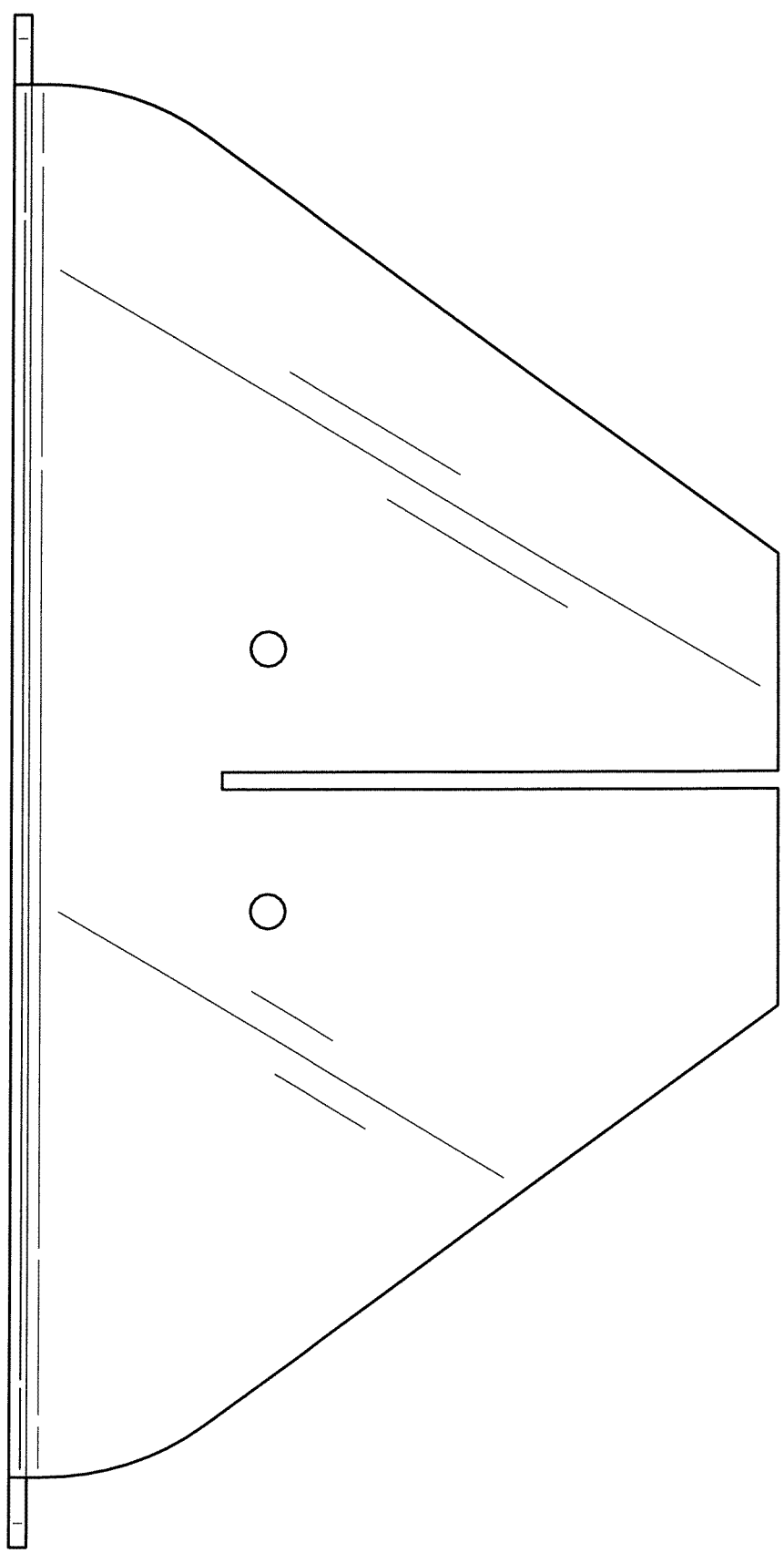
FIG. 7 is a bottom plan view thereof.
Figure 9:
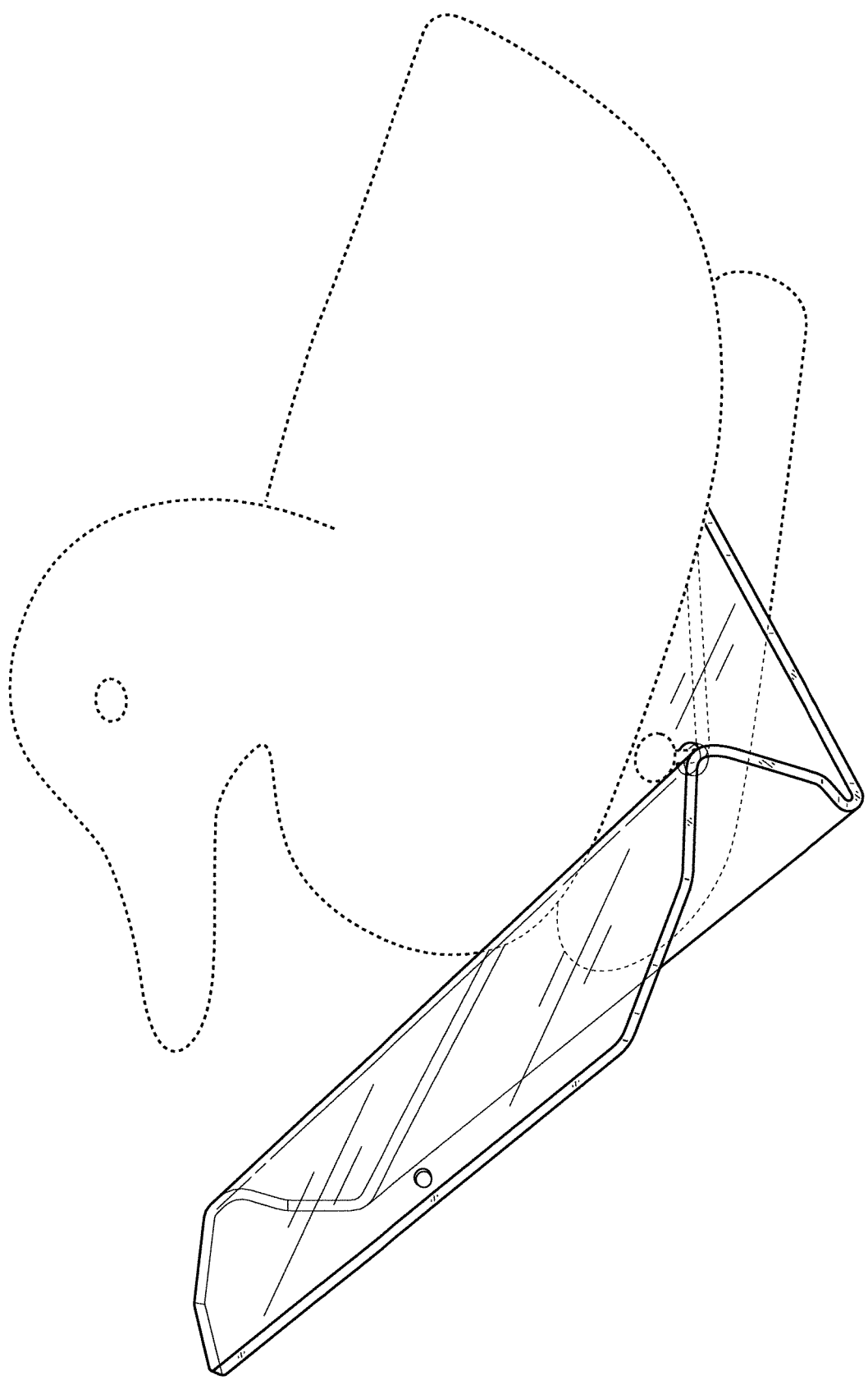
FIG. 9 is an enlarged-scale perspective view thereof, except with the aquatic environmental subject matter removed from view.
Figure 10:
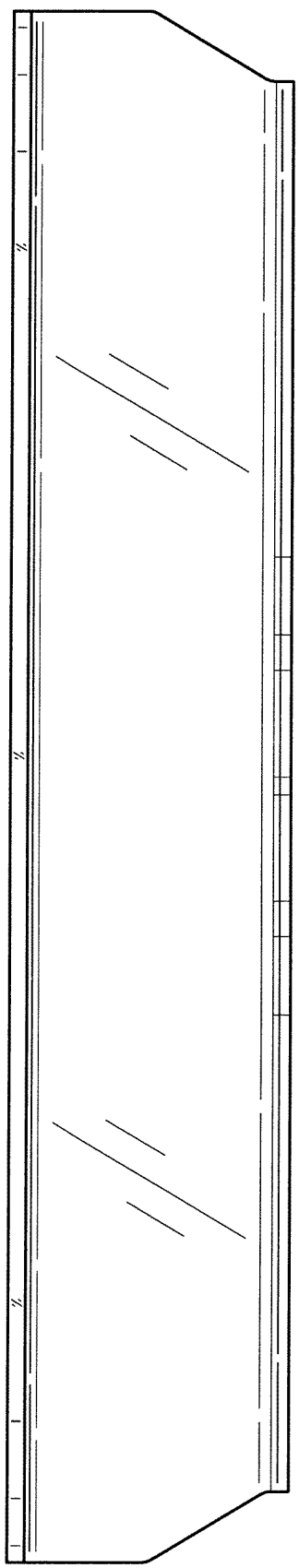
FIG. 10 is an enlarged-scale front elevational view thereof, with all environmental subject matter removed from view.
Figure 11:
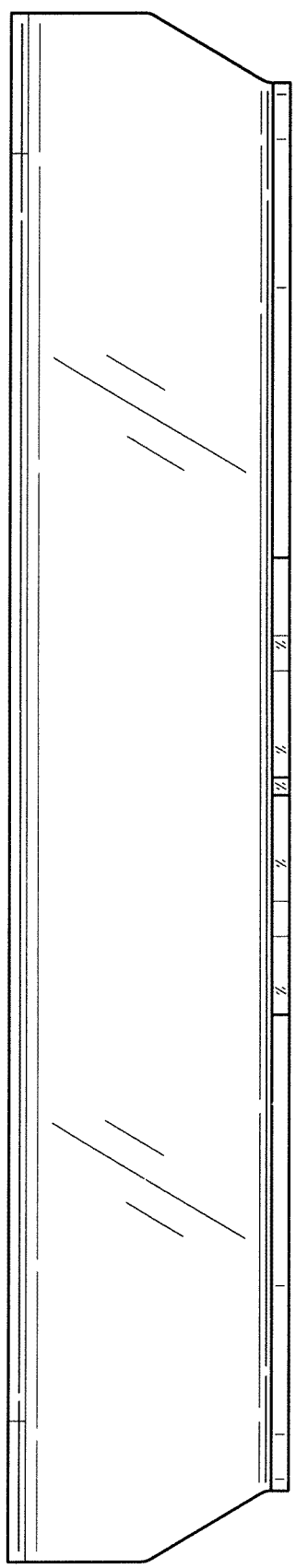
FIG. 11 is a rear elevational view thereof.
Figure 12:
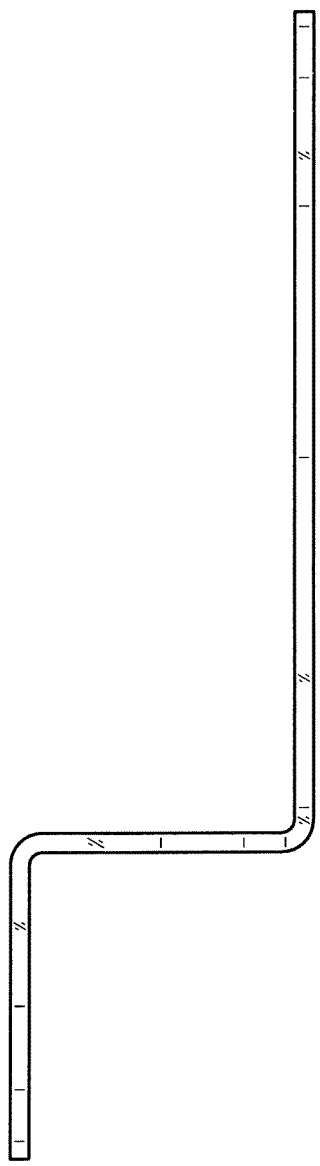
FIG. 12 is a left side elevational view thereof, the right side being a mirror opposite.

As FIGS. 2 and 9 as well as 20 show, it is an aspect of the invention to lock the bill onto the decoy by a bungee shock cord belt loop. The bungee shock cord belt loop is preferably three-sixteenths inch diameter marine grade bungee shock cord, about fifteen inches long with a knot on both ends. FIG. 20 is a bottom plan view comparable to FIG. 14, except showing a slightly altered version of the second embodiment. FIG. 20 further showing the bungee shock cord belt loop in accordance with the invention for tethering or strapping the animation-action imparting swim bill onto the decoy. In FIGS. 2 and 9, the bungee shock cord belt loop is fairly faintly illustrated.

The ends of the bungee shock cord belt loop project out the two holes in the mounting panel that are disposed symmetrically on opposite sides of the closed-ended slot. The knots are on the top surface of the mounting panel, the loop mid-span is disposed underneath the bottom surface of the mounting panel.

So the steps of mounting of the animation-action imparting swim bill onto the decoy include the following. Slide the bill and decoy into place by sliding the forward termination of the decoy's keel into the swim-bill's closed-ended slot. Continue to do so until either, one, the keel's forward termination and closed end of the closed ended slot are in abutment, and/or also, two, the some front portion of the decoy and the rear surface of the front wall are in abutment. Now recall the front and rear notches of the decoy that are defined respectively by (1) the flat belly, the front termination of the keel, and the bow of the ballast pontoon; as well as (2) the flat belly again, the rear termination of the keel, and the stern of the ballast pontoon.

It should now be appreciated that, the portions of the mounting panel that are immediately forward of the closed end of the closed-ended slot, are now in occupancy in the forward notch. Thus at this stage, pinch and stretch that bungee shock cord belt loop at and from its middle like a bow string. Continuing stretching until the pinch-hold is past the stern of the ballast pontoon, and then release that bungee shock cord belt loop into the rear notch.

It is a highly effective mounting/locking technique. While decoy and animation-action imparting swim bill are not actually welded together, they essentially are.

In jerk line use, this first embodiment of the combination decoy and swim bill tends to exhibit the following characteristics.

On a short bungee shock cord anchor line, jerking the jerk string tends to have the decoy tilt its head underwater. That is, tilt in the manner of a dabbling duck. However, the broad front wall pushes a substantial wave, more so than any actual live waterfowl with a body size of about the same size as the decoy. Nevertheless, despite producing an unnaturally large splash, the unnaturally large splash still attracts live birds.

On a long bungee shock cord anchor line, where the decoy is going to swim back to the T-handled anchor pole, the broad front wall tends to produce a zig-zag return. Contrast this with the second embodiment of animation-action imparting swim bill as shown in FIGS. 8-14 and 20. The second-embodiment swim bill shares essentially all that was described above for the first-embodiment swim bill. In the briefest aspects, the second-embodiment swim bill comprises (1) a generally horizontal mounting panel (2) that transitions at a fold line (3) into a generally vertical front wall. However, the second-embodiment swim bill is distinguished in the following. While the second-embodiment front wall is proportionally more less the same width as first-embodiment front wall, the second-embodiment front wall is only about as half as tall as the first-embodiment front wall. That is, above it was said, preferably the first-embodiment front wall would be about two to four inches (five to ten cm) high. Well, more preferred still if the first-embodiment front wall would be about four inches (ten cm) high.

It is preferred if the second-embodiment front wall would be about one and a half to two inches (three and three-fourths to five cm) high. Also, the second-embodiment front wall does not top out at a top edge. Instead, second-embodiment front wall transitions at an upper fold line into a horizontally- and forwardly-projecting diving plane.

The diving plane is preferably between about two and three inches (five and seven and one-half cm) long in fore to aft length. The front corners of the diving plane might have forty-five degree chamfers of about one inch by one inch (two and one-half by two and one-half cm).

So the first-embodiment swim bill has an "L" shaped profile, while the second-embodiment swim bill has a "square-Z" shaped profile. It will be recalled from above that, on a long bungee shock cord anchor line, when the first-embodiment combination swim bill/decoy is released to swim back to the T-handled anchor pole, the broad front wall tends to produce a zig-zag return. Well now, when the second-embodiment combination swim-bill/decoy is released to swim back to the T-handled anchor pole, the second-embodiment front wall and diving plane cooperatively tend to produce a porpoising return (alternating cycles of head bobbing).

Figure 13:
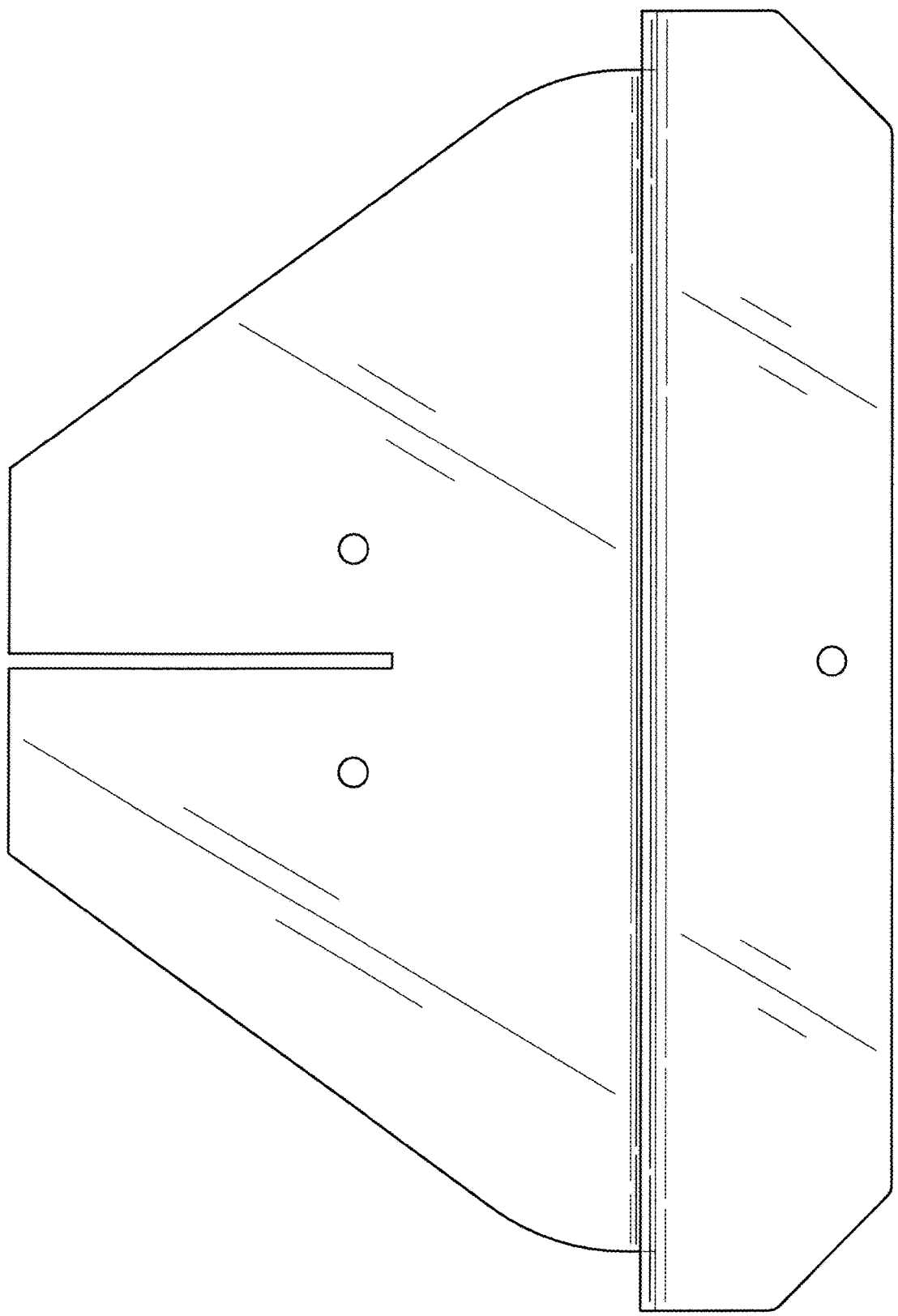
FIG. 13 is a top plan view thereof.

FIG. 20 shows a variation of the second-embodiment swim bill which not only has an abbreviated mounting plate but also a hole through about the center of the diving plane (this extra hole is also shown in FIGS. 9 and 13-14). This extra hole allows for an extra location to secured either the bungee shock cord anchor line or the jerk string. Some final remarks include the following.

When the combination swim bill/decoy is at rest in calm water (for both embodiments), there is a natural waterline.

For the first-embodiment combination swim bill/decoy, the first-embodiment front wall has the following characteristics, namely:

it has a broad width about twice as great as the decoy's body-width at the waterline;
it has a low elevation that, when the decoy is at rest, the low elevation is submerged below the waterline; and
it has a high elevation such that the waterline is about half-way up the first-embodiment front wall.

In consequence thereof, the first-embodiment front wall or at least some portions thereof—on swimming returns on long bungee shock cord anchor line—are dry (ie., above waterline). During such swimming returns, the first-embodiment front wall appears to catch water on one side that zigs the decoy one way, then spills that water off that side and catches water on the opposite side, which zags the decoy the other way. Hence the first-embodiment combination swim bill/decoy tends to have a zig-zag swimming return.

For the second-embodiment combination swim bill/decoy (for both variations), the second-embodiment front wall has the following characteristics, namely:

it has a similarly broad width, ie., about twice as great as the decoy body-width at the waterline;
it has similarly a low elevation that, ie., when the decoy is at rest, the low elevation is submerged below the waterline; but
it has a high elevation such that the high elevation is also submerged below the waterline, or maybe just barely or nearly so.

In consequence thereof, the diving plane is riding just at or just barely below the waterline.

During the second-embodiment combination swim bill/decoy's return swim (eg., the bobbing-head return), the diving plane alternates between dives until the tail of the decoy rises, and, breaches where at least portions of the diving plane are dry (or above waterline). Thus the second-embodiment combination swim bill/decoy tends to have a head-bobbing swimming return.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An improvement for buoyant floating waterfowl decoy comprising:
 a water-plowing front wall mounted crosswise across the breast of the decoy; wherein the front wall:
  has a broad width about the same as or twice as great as the decoy body-width at the waterline;
  has a low elevation that, when the decoy is at rest, the low elevation is submerged below the waterline; and
  has a high elevation that, when the decoy is at rest, is about level with the waterline or the waterline is about half-way up the front wall.

2. The improvement for buoyant floating waterfowl decoy of claim 1, further comprising:
 a trailing generally horizontal panel meeting the front wall at the low elevation and trails behind.

3. The improvement for buoyant floating waterfowl decoy of claim 2, wherein:
 the trailing generally horizontal panel is formed with a slot for accepting insertion of a keel of the decoy, thereby enabling mounting of the improvement to the decoy.

4. The improvement for buoyant floating waterfowl decoy of claim 2, further comprising:
 an upper generally horizontal panel meeting the front wall at the high elevation and projecting forward.

5. The improvement for buoyant floating waterfowl decoy of claim 4, wherein:
 said improvement comprises a monolithic piece of material.

6. An improvement for buoyant floating waterfowl decoy comprising:
 a water-plowing front wall mounted crosswise across the breast of the decoy; wherein the front wall:
  has a low elevation that, when the decoy is at rest, the low elevation is submerged below the waterline; and
  has a high elevation that, when the decoy is at rest, is about level with the waterline or the waterline is about half-way up the front wall; and
 a trailing generally horizontal panel meeting the front wall at the low elevation and trails behind.

7. The improvement for buoyant floating waterfowl decoy of claim 6, wherein:
 the trailing generally horizontal panel is formed with a slot for accepting insertion of a keel of the decoy, thereby enabling mounting of the improvement to the decoy.

8. The improvement for buoyant floating waterfowl decoy of claim 6, further comprising:
 an upper generally horizontal panel meeting the front wall at the high elevation and projecting forward.

9. The improvement for buoyant floating waterfowl decoy of claim 8, wherein:
 said improvement comprises a monolithic piece of material.

* * * * *